United States Patent
Shao

(10) Patent No.: US 6,710,349 B2
(45) Date of Patent: Mar. 23, 2004

(54) EDGE RESOLVED DUAL SCINTILLATOR GAMMA RAY DETECTION SYSTEM AND METHOD

(75) Inventor: Yiping Shao, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 157 days.

(21) Appl. No.: 10/063,369

(22) Filed: Apr. 16, 2002

(65) Prior Publication Data

US 2003/0193029 A1 Oct. 16, 2003

(51) Int. Cl.[7] .............................................. G01T 1/164
(52) U.S. Cl. ........................ 250/363.03; 250/363.02; 250/366
(58) Field of Search ...................... 250/363.03, 363.01, 250/363.02, 363.04, 363.09, 363.1, 366, 367, 369, 393, 370.11, 370.14

(56) References Cited

U.S. PATENT DOCUMENTS

| 4,618,773 A | * | 10/1986 | Drukier .................. 250/363.02 |
| 4,755,680 A | * | 7/1988 | Logan .................... 250/363.01 |
| 5,032,728 A | * | 7/1991 | Chang et al. .......... 250/363.04 |
| 5,591,977 A | | 1/1997 | Green et al. |
| 5,784,432 A | * | 7/1998 | Kurtz et al. .................. 378/70 |
| 5,810,742 A | | 9/1998 | Pearlman |
| 5,872,828 A | | 2/1999 | Niklason et al. |
| 5,998,792 A | | 12/1999 | DiFilippo |
| 6,040,580 A | * | 3/2000 | Watson et al. ......... 250/363.03 |
| 6,180,943 B1 | | 1/2001 | Lange |
| 6,180,946 B1 | * | 1/2001 | Ebstein .................. 250/370.11 |
| 6,552,348 B2 | * | 4/2003 | Cherry et al. .......... 250/363.03 |
| 2003/0001098 A1 | * | 1/2003 | Stoddart et al. ....... 250/363.04 |

OTHER PUBLICATIONS

H. Murakami: "A Simple Pulse Shape Discrimination Method for the Phoswich Counter," IEEE Transactions on Nuclear Scient, Oct. 1992, pp. 1316–1320, vol. 39, No. 5, IEEE.

R. Novotny et al.: "A Plastic–$BaF_2$ Phoswich Telescope for Charged/Neutral Particle and Photon Detection," IEEE Transactions on Nuclear Science, Jun. 1996, pp. 1260–1266, vol. 43, No. 3, IEEE.

T. Takahashi et al.: "Newly Developed Low Background Hard X–ray/Gamma–ray Telescope with the Well–type Phoswich Counters," IEEE Transactions on Nuclear Science, Aug. 1993, pp. 890–898, vol. 40, No. 4, IEEE.

* cited by examiner

Primary Examiner—Constantine Hannaher
Assistant Examiner—Otilia Gabor
(74) Attorney, Agent, or Firm—Foley & Lardner

(57) ABSTRACT

A detector includes a first position sensitive radiation detector having a first radiation sensitive area and a second radiation insensitive area. The detector further includes a first scintillator having a first decay time, located adjacent to the first radiation sensitive area and a second scintillator having a second decay time different than the first decay time, located adjacent to the second radiation insensitive area and being optically coupled to the first scintillator.

29 Claims, 8 Drawing Sheets

3X3 mls
@ the ¼ edge pspmt
na-22 source
700 HV

3x3 mls
@ edge PSPMT
700 HV
Na-22 source

Second scintillators 13
First scintillarors 11
Scintillator array 9
PS-PMT 1

First PS-PMT 1
Second PS-PMT 21
First PET ring 23
Second PET ring 25

EDGE RESOLVED DUAL SCINTILLATOR GAMMA RAY DETECTION SYSTEM AND METHOD

BACKGROUND OF THE INVENTION

The present invention relates generally to an imaging system and method, and more particularly to a positron emission tomography (PET) detection system and method.

Conventional PET detectors use an array of scintillator crystals (i.e., scintillator pixels) optically coupled to a position-sensitive photo multiplier tube ("PS-PMT") to achieve high spatial resolution and compactness. However, the edge areas 3 of the detection surface (i.e., the front face) of a PS-PMT 1 are radiation insensitive, as shown by gray bands in FIG. 1. This prevents the use of the entire PS-PMT front to detect radiation emitted by the scintillator pixels. Thus, only the radiation sensitive central area 5 of the front face of the PS-PMT 1 is used to detect radiation, such as photons, emitted by the scintillator pixels when the pixels are irradiated by the gamma rays. This is termed an "edge problem."

The edge problem is particularly troublesome in PET systems having multiple detector rings, because a detection gap is formed at the ring edges. Since PS-PMTs are provided inside the rings, the ring edges contain the PS-PMT edge areas 3 which are radiation insensitive. When two rings are axially coupled, two PS-PMT radiation insensitive edge areas 3 are located adjacent to each other, exacerbating the edge problem. Thus, even if the detector rings contact each other, a detection gap (i.e., blank region) is formed in the image at the contact point of adjacent rings. In the prior art multiple detector ring PET system, in order to overcome the edge problem, an optical fiber (or optical waveguide) bundle 7 was used to couple radiation from the scintillator pixel array 9 to the PS-PMT 1, as shown in FIG. 2. However, the extra coupling, the absorption of the optical fiber, and most significantly the limited acceptance angle of optical fiber causes severe reduction of the number of photons (about 70–80% reduction) that can be detected by the PS-PMT. Alternatively, a single ring PET system may be used. However, such as system provides a limited axial coverage, which may be undesirable for some applications.

The PET system edge problem is illustrated in FIGS. 3 and 4 below. A Hamamatsu® R8520 PS-PMT with a resistor network chain for signal multiplexing and position dependent signal output for interaction positioning was used as a PS-PMT. Na-22 was used as the isotope source. The scintillator pixel array was attached to the PS-PMT with optical grease. The scintillator pixel array contained a 3×3 array of mixed lutetium oxyorthosilicate ("MLS") crystals having the following dimensions: 1.5×1.5×7 mm. Each crystal was wrapped with white PTFE tape leaving about a 0.2 mm gap between crystals.

When the 3×3 array was attached at one quarter of the front face (i.e., detection surface) of the PS-PMT, all scintillator crystals were inside the radiation sensitive area 5 of the PS-PMT 1. In the position map (i.e., flood source image) shown in FIG. 3A, all nine crystals are clearly identified. The profile plots of the central row and column shown in FIGS. 3B and 3C, respectively, show very good separations between crystals. Thus, as expected, no edge problem was observed because all crystals were provided inside the radiation sensitive area of the PS-PMT.

However, when the same scintillator array (3×3) was mounted at the edge of the face of PS-PMT 1, the left most column of the scintillator pixels was mounted adjacent to the radiation insensitive area 3 of the PS-PMT 1. Thus, the left most column of the scintillator pixels is not visible in the position map in FIG. 4A. Likewise, the pixel from the left most column was not visible in the profile plot of the lower row of pixels shown in FIG. 4B. Thus, the three pixels in this column either can't be detected by PS-PMT, or can't be distinguished from others because the photons from this column fell into the same anode of the PS-PMT as the photons from the middle column of pixels. This is an illustration of the edge problem.

BRIEF SUMMARY OF THE INVENTION

In accordance with one preferred aspect of the present invention, there is a detector, comprising a first position sensitive radiation detector having a first radiation sensitive area and a second radiation insensitive area, a first scintillator having a first decay time, located adjacent to the first radiation sensitive area, and a second scintillator having a second decay time different than the first decay time, located adjacent to the second radiation insensitive area and being optically coupled to the first scintillator.

In accordance with another preferred aspect of the present invention there is provided a PET detection system, comprising a first detector ring, a second detector ring adjacent to and coaxial with the first detector ring, a first PS-PMT located on the first detector ring and a second PS-PMT located on the second detector ring, adjacent to the first PS-PMT, such that a first edge area of the first PS-PMT detection surface is adjacent to a first edge area of the second PS-PMT detection surface. The system further comprises a plurality of first scintillator pixels having a first decay time mounted adjacent to the detection surfaces of the first and the second PS-PMTs and at least one second scintillator pixel having a second decay time different from the first decay time, mounted adjacent to each of the first edge area of the first PS-PMT detection surface and the first edge area of the second PS-PMT detection surface. Each of the second scintillator pixels are optically coupled to an adjacent first scintillator pixel.

In accordance with another preferred aspect of the present invention, there is provided an imaging method, comprising receiving electromagnetic radiation at a first scintillator from a radiation source, emitting first radiation from the first scintillator having a first decay time and receiving the first radiation at a first radiation sensitive area of a first position sensitive radiation detector. The method also comprises receiving electromagnetic radiation at a second scintillator from the radiation source, emitting second radiation from the second scintillator having a second decay time different than the first decay time, and propagating the second radiation through the first scintillator to the first radiation sensitive area of the first position sensitive radiation detector. The method further comprises distinguishing a difference between the first decay time and the second decay time, and forming a position sensitive image from electromagnetic radiation received by the first and the second scintillators based on the difference between the first decay time and the second decay time.

BRIEF DESCRIPTION OF THE DRAWINGS

FIGS. 3 and 4 are plots illustrating the edge problem in the prior art PET detectors.

DETAILED DESCRIPTION OF THE INVENTION

Figure 1:
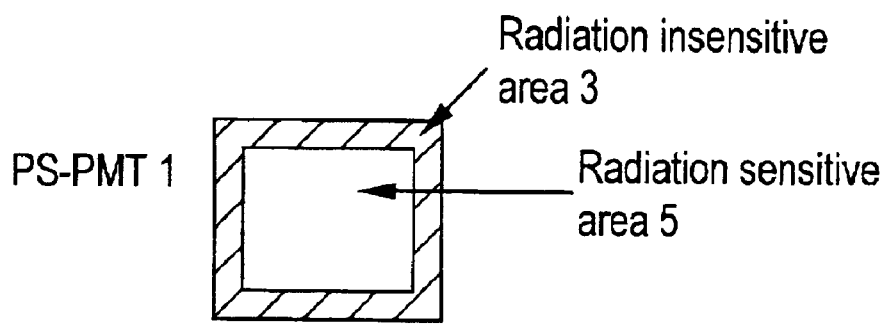
FIG. 1 is a schematic of the detection surface of a prior art PS-PMT.
Figure 2:
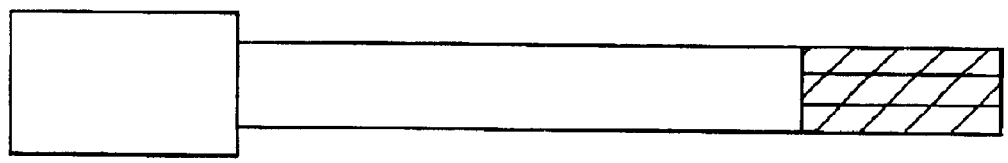
FIG. 2 is schematic of a prior art way to overcome the edge problem using optical fiber coupling of the pixels to the PS-PMT.
Figure 3A:
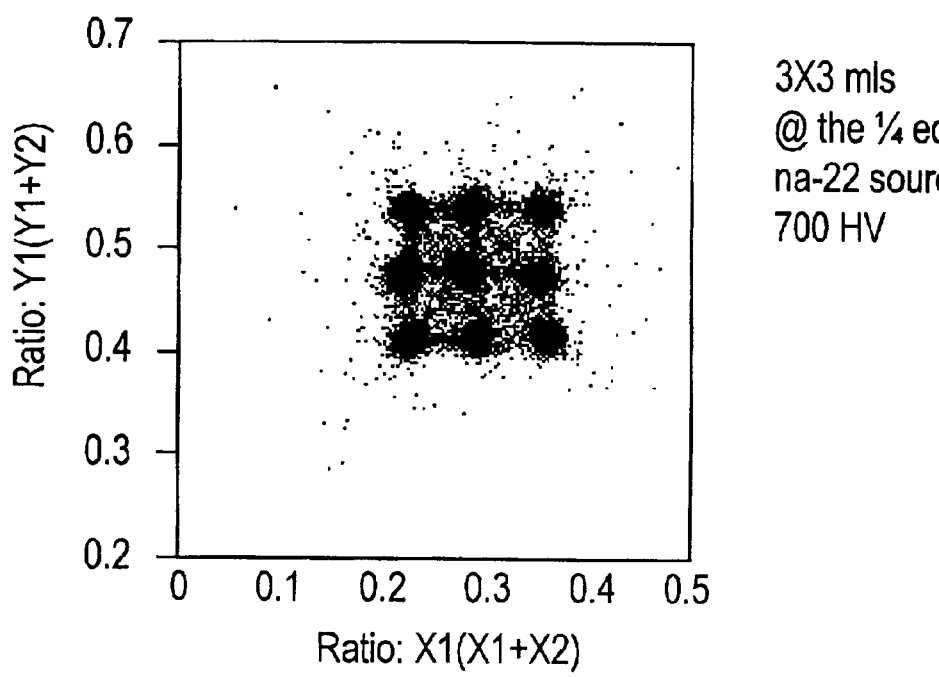
FIGS. 3A and 4A are position maps.
Figure 3B:
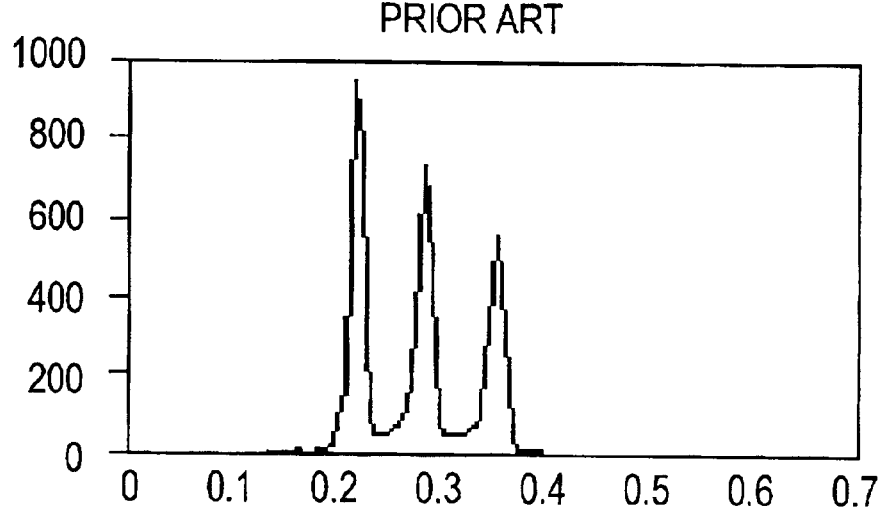
FIGS. 3B and 4B are row profile plots and FIG. 3C is a column profile plot.
Figure 3C:
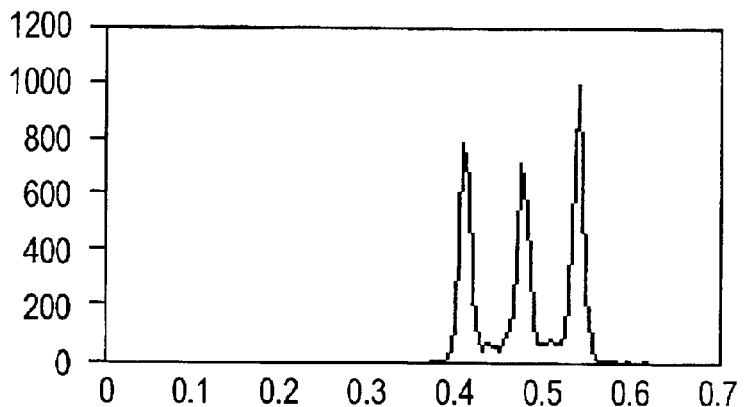
Figure 4A:
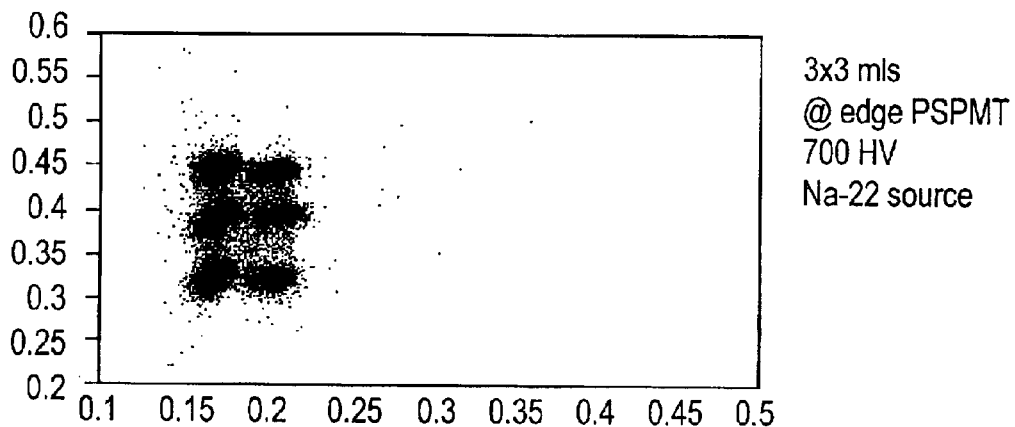
Figure 4B:
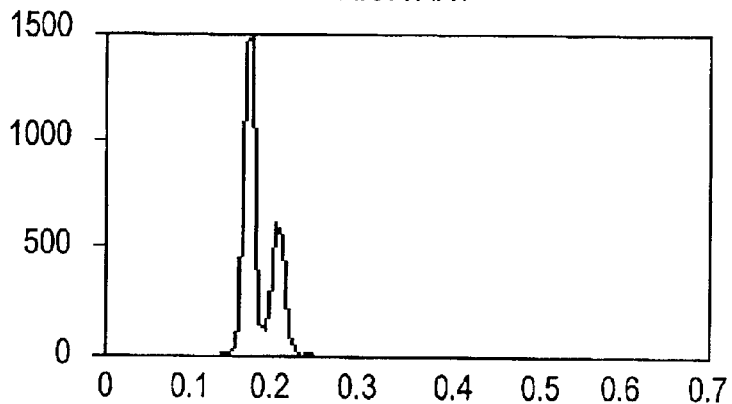

The present inventor has discovered that the edge problem can be solved by using a first scintillator having a first decay time adjacent to radiation sensitive area of the photodetector, and by using a second scintillator having a different, second decay time adjacent to radiation insensitive area of the photodetector, such that the first and the second pixels are optically coupled. Thus, a multiple detecting ring tomography system eliminates or substantially reduces image gaps between each detector ring. This significantly improves the detector performance since there is no need to use optical fibers to couple the scintillator pixels to the photo detector to solve the edge problem.

When the inner and outer scintillator pixels are optically coupled to each other, the outer pixel, which is optically coupled to the radiation insensitive area at the edge of the detector can share the photons with an adjacent inner pixel, which is optically coupled to the radiation sensitive area of the detector. Therefore, the photons (i.e., radiation) emitted from the outer pixel can pass through adjacent inner pixels to the radiation sensitive area of the detector and get detected by the detector.

In the case of a PS-PMT detector, the radiation from both outer edge and adjacent inner pixels is detected at the same photo cathode area, and sensed by the same anode near the PS-PMT edge (the last anode at the edge). The ratio for the signals from both pixels are about the same, which makes it difficult to distinguish the signals in a position sensitive manner. A similar effect occurs for other photodetectors with an edge problem.

However, when the outer pixels have a different (i.e., larger or smaller) decay time than the inner pixels, the radiation emitted by the outer pixels can be separated from the radiation emitted by the inner pixel by distinguishing the timing or decay difference between the pixels. This distinguishing can be achieved by using different timing methods.

For example, in one preferred aspect of the present invention, a signal integration method may be used to distinguish the decay time between the inner and outer pixels. In this method, the signal from the PS-PMT is integrated with two different integration times. Then, the ratio of the integration values are compared to each other. This ratio is sensitive to the decay time. This integration method is used widely in prior art phoswich detector designs for identifying different crystals at different crystal layers. However, the phoswich detectors are not used to solve the edge problem in a PS-PMT. In a phoswich detector, different scintillator crystals are layered over each other. Thus, the same radiation sensitive detection surface of the detector is overlayed by two different scintillators. In contrast, in the preferred embodiments of the present invention, two different scintillators are optically coupled over different detection areas, namely, the radiation sensitive and the radiation insensitive areas of the photo sensors. The phoswich detectors are described in H. Murakami, et al., 39 IEEE Transactions on Nuclear Science, (5) page 1316 (October 1992); T. Takahashi, et al., 40 IEEE Transactions on Nuclear Science (4), page 890 (August 1993); and R. Novotny, et al., 43 IEEE Transactions on Nuclear Science, (3) page 1260 (June 1996), incorporated herein by reference in their entirety.

In another preferred aspect of the present invention, a signal branching method may be used to distinguish the decay time between radiation from the inner and outer pixels. This method will be described in more detail with respect to the specific example of the present invention. Thus, a position sensitive image may be obtained despite that the radiation from outer and inner pixels is detected by the same photo cathode and sensed by the same photo anode of the PS-PMT.

The optically coupled scintillator pixels or crystals may be used with any type of a position sensitive radiation detector which is adapted to detect the radiation (i.e., visible light, IR or UV radiation) emitted by the scintillators in response to the scintillators being irradiated with electromagnetic radiation, such as gamma rays. Preferably, the optically coupled scintillators with a different decay time are used with a radiation detector which suffers from the edge effect. Most preferably, the radiation detector comprises PS-PMT. However, other vacuum type radiation detectors may also be used. Alternatively, the radiation detector comprises a solid state photodetector, such as a semiconductor photodetector (including avalanche photodiodes, charge coupled devices and other solid state radiation detectors).

Figure 5:
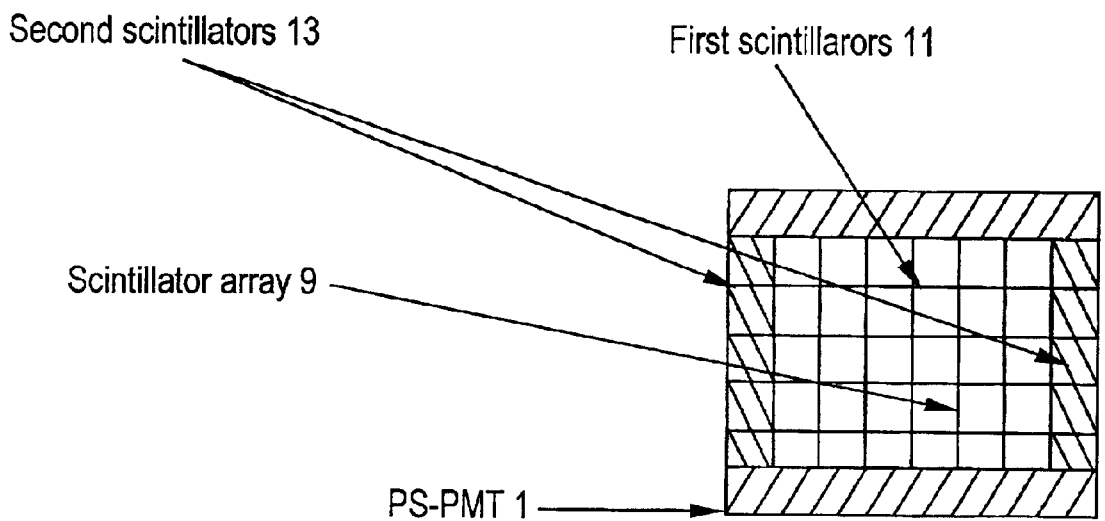
FIG. 5 is a schematic illustration of a scintillator pixel array optically coupled to a PS-PMT according to a preferred embodiment of the present invention.

FIG. 5 illustrates a detector according to a preferred embodiment of the present invention. As shown in FIG. 5 and with reference to FIG. 1, a PS-PMT radiation detector 1 contains a radiation sensitive area 5 in the middle of its detection surface (i.e., front face) and a radiation insensitive 3 area around the edge or periphery of the its detection surface. These areas 3 and 5 are adjacent areas on the detection surface of the PS-PMT. A first face of the first scintillator 11, having the first decay time, is connected to the radiation sensitive area of the PS-PMT 1. For example, there may be a plurality of pixels of first scintillator 11 attached to the central area of the PS-PMT face, as shown in FIG. 5. Alternatively, there may be only one large first scintillator 11 crystal.

A first face of the second scintillator 13, having the second decay time different from the first decay time, is connected to the radiation insensitive area of the PS-PMT 1. For example, there may be a plurality of pixels of second scintillator 13 attached to the edge areas of the PS-PMT face, as shown in FIG. 5. Alternatively, there may be only one large second scintillator 13 crystal. While the second scintillator(s) 13 may be attached to the entire periphery of the PS-PMT detection region, preferably the second scintillator(s) 13 is attached to two opposite edge regions, such as the lateral edge regions, while leaving the other edge regions, such as the vertical edge regions uncovered for ease of mounting of all scintillators to the PS-PMT detection surface. Thus, as shown in FIG. 5, the second scintillators 13 comprise the two edge pixel columns, while the first scintillators 11 comprise the remaining columns. The term "column" is interchangeable with the term "row" depending on the orientation of the PS-PMT. The edges of the first scintillator pixels 11 contact the edges of the second scintillator 13 to optically couple the first and the second scintillators. However, in an alternative aspect of the present invention, the optical coupling may be achieved by placing an optical coupler (such as a fiber or planar waveguide) between the pixels 11 and 13 instead of, or in addition to placing adjacent pixels 11 and 13 in direct physical and optical contact.

The first decay time of the first scintillator 11 may be larger or smaller than the second decay time of the second scintillator 13, as long as it is different. Preferably, first decay time of the first scintillator differs from the second decay time of the second scintillator by at least 20, preferably at least 100 nanoseconds. This differences depends on how good the timing method is to be used in the application. Preferably, the first and second scintillator materials are the same material but with different decay time in order to have a uniform performance over different areas. Alternatively, the first and the second scintillator materials are different materials with close performance specifications other than decay times. For example, the first scintillator material may be selected from MLS, bismuth germanate ("BGO") and lutetium oxyorthosilicate ("LSO"), and the second scintillator material may be selected from one of MLS, BGO and LSO. Other suitable scintillator materials may also be used. The scintillator materials preferably comprise gamma ray sensitive scintillator materials, which emit radiation upon absorbing gamma rays. However, other types of scintillator materials, such as X-ray sensitive scintillator materials may be used if an X-ray detection system is desired, for example.

The detector illustrated in FIG. 5 may be used for any suitable purpose. For example, the detector may be used in a gamma ray camera, a gamma ray telescope or a nuclear medicine detection system, such as a positron emission tomography (PET) or a single photon emission computed tomography ("SPECT") system. Furthermore, the system may be used to detect something other than gamma rays. For example, the system may be an X-ray detection system using X-ray sensitive scintillators. Preferably, the detector is used in a PET system, such as a small animal PET system.

Preferably, the nuclear medicine detection system contains at least two coaxial detector rings, such that the edge problem is reduced or eliminated. The rings (which include ring segments) may be stationary or rotating about the detection area (i.e., where a patient or animal is located). However, the nuclear medicine system is not limited to a configuration containing plural coaxial detector rings. The system may be configured to have only one ring or configured to have one or more separate detectors arranged in any manner around the detection area. For example, the system may contain two rectangular detectors arranged at right angles to each other or on opposite sides of the detection area or, three polygonal detectors arranged substantially in a triangle or in a "U"-shaped detection area, as described in U.S. Pat. Nos. 6,180,943, 5,998,792 and 5,591,977, incorporated herein by reference.

Figure 6:
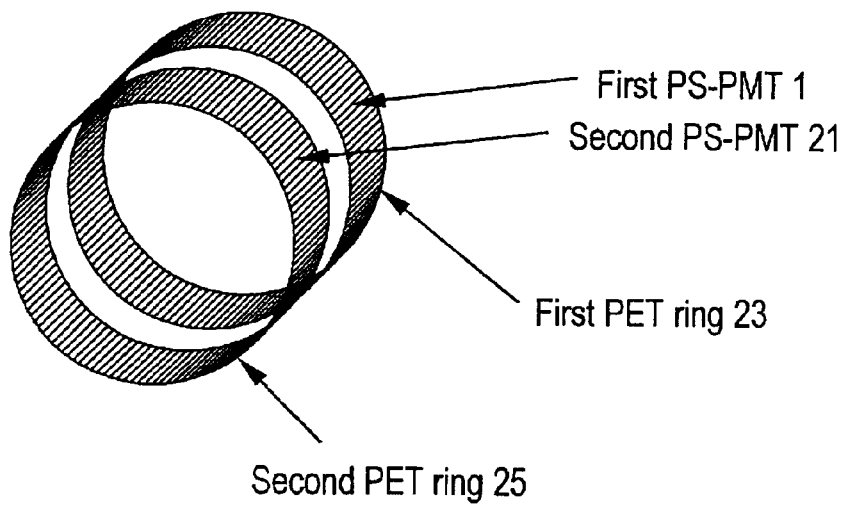
FIG. 6 is a three dimensional view of coaxial detector rings containing PS-PMTs according to a preferred embodiment of the present invention.
Figure 7:
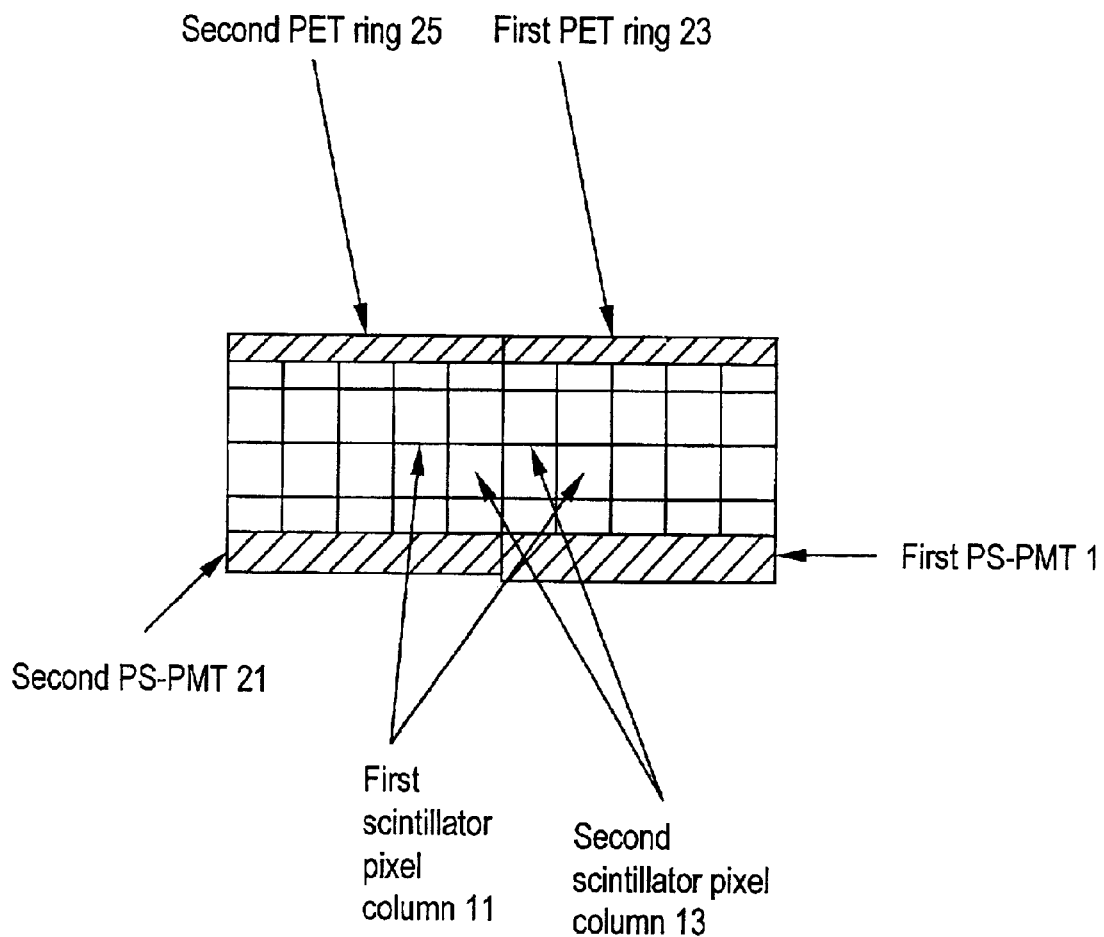
FIG. 7 is a side view of a schematic illustration of scintillator pixel arrays optically coupled to PS-PMTs arranged on adjacent detector rings of a PET system according to a preferred embodiment of the present invention.

FIG. 6 illustrates a portion of a nuclear medicine detection system, such as a PET system, which contains two adjacent, coaxial detector rings 23 and 25. FIG. 7 shows portions of the rings 23 and 25 viewed from the inside of the rings. Each ring 23 and 25 contains a plurality of adjacent radiation detectors, such as PS-PMTs 1 and 21, as shown in FIG. 6. Only one PS-PMT 1, 21 is shown for each ring, 23, 25 in FIG. 7 for clarity.

The first PS-PMT 1 is located on the first detector ring 23. The second PS-PMT 21 is located on the second detector ring 25, adjacent to the first PS-PMT 1. An edge area of the first PS-PMT 1 detection surface is located adjacent to an edge area of the second PS-PMT 21 detection surface. A plurality of first scintillator pixels 11 having a first decay time are mounted adjacent to the detection surfaces of the first and the second PS-PMTs 1, 21. At least one second scintillator pixel 13 having a second decay time different from the first decay time is mounted adjacent to an edge area of the first PS-PMT 1 detection surface and to an adjacent edge area of the second PS-PMT 21 detection surface. Preferably, there are a plurality of the second scintillator pixels 13 arranged in a column in the adjacent edge areas of the first and the second PS-PMTs, as shown in FIG. 7. Each of the second scintillator pixels 13 is optically coupled to an adjacent first scintillator pixel 11 (i.e., the adjacent pixels 11, 13 mounted to the same PS-PMT are optically coupled together).

The first scintillator pixels 11 are located adjacent to radiation sensitive areas of the first 1 and the second 21 PS-PMTs detection surfaces. The second scintillator pixels 13 are located adjacent to radiation insensitive areas of the first 1 and the second 21 PS-PMTs detection surfaces. An edge of a first scintillator pixel 11 contacts an edge of an adjacent second scintillator pixel 13 to optically couple the first and the second scintillator pixels.

The PET system also comprises a processor (not shown for clarity in the Figures), such as a general or a special purpose computer or a microprocessor chip, such as an ASIC chip. The processor is adapted to receive an electrical signal from the first 1 and the second 21 PS-PMTs and to form a position sensitive image based on the received signals based on a difference between the first decay time and the second decay time.

Therefore, there is no detection gap between the first detector ring 23 and the second detector ring 25. Thus, the edge problem in the PET system described above is eliminated or reduced. Furthermore, the first and the second scintillator crystals may be coupled to the respective first and second PS-PMTs without optical fibers, as was required in the prior art.

The PET system shown in FIGS. 6 and 7 is not limited to two detection rings. system may have three or more coaxial rings if desired. For example, the third detector ring may be formed adjacent and coaxial with the second detector ring. A third PS-PMT may be located on the third detector ring, such that an edge area of the third PS-PMT detection surface is adjacent to an edge area of the second PS-PMT detection surface. A plurality of first scintillator pixels having a first decay time may be mounted adjacent to the detection surface of the third PS-PMT. At least one second scintillator pixel having a second decay time different from the first decay time may be mounted adjacent to the first edge area of the third PS-PMT detection surface, where the at least one second scintillator pixel is optically coupled to an adjacent first scintillator pixel. Furthermore, the system shown in FIGS. 6 and 7 and described above is not limited to a PET system, but may also comprise a SPECT system or another detection system.

An imaging method using the optically coupled scintillators with different decay times illustrated in FIG. 5 will now be described. While this method is preferably a PET method, it may comprise other detection methods, such as a SPECT or other gamma ray detection methods.

A radiation source, such as a human or an animal injected with a radioactive tracer, emits electromagnetic radiation, such as gamma rays. Preferably, the tracer generates positrons in the human or animal, (i.e., a PET method) while the positrons generate gamma rays upon annihilation with electrons. The first scintillator 11 receives the electromagnetic radiation, such as the gamma rays from the radiation source. In response to the received electromagnetic radiation, the first scintillator emits first radiation having a first decay time. The first radiation is received at a first radiation sensitive area 5 of a first position sensitive radiation detector, such as a PMT 1.

The second scintillator 13 receives the electromagnetic radiation, such as gamma rays, from the radiation source. The second scintillator 13 emits second radiation having a different second decay time. The second radiation propagates through the first scintillator 11 to the first radiation sensitive area 5 of the first PS-PMT 1.

The PS-PMT 1 outputs to the processor a first electrical signal based on the first and the second radiation received by its radiation sensitive area. The processor determines a difference between the first decay time and the second decay time by using any suitable method, such as the signal integration method described above or the signal branching method described below with respect to the specific example. The processor then forms a position sensitive image based on the electromagnetic radiation received by the first and the second scintillators based on the difference between the first decay time and the second decay time. The image is then displayed, stored in electronic or pictorial form and/or transmitted to a remote location, as desired.

In the system illustrated in FIGS. 6 and 7, the above described method is repeated for the second PS-PMT 21 mounted to the second detector ring 25. The second PS-PMT 21 outputs a second electrical signal to the processor based on the first and the second radiation it received from its respective scintillators 11, 13. The processor correlates the first and the second electrical signals received from the first and second PS-PMTs, respectively, and forms the position sensitive image based on the first and the second electrical signals.

Specific example. A Hamamatsu ® R8520 PS-PMT with a resistor network chain for signal multiplexing and position dependent signal output for interaction positioning was used as a PS-PMT. Na-22 was used as the isotope source. The scintillator pixel array was attached to the PS-PMT with optical grease.

The signals from the PS-PMT were branched into two paths, with one path delayed by about 150 ns. Both signals were processed with a shaping amplifier using the same shaping conditions (1 micro second shaping time). Then, signal sampling and digitization were taken with a common gate to both signals. In this way, signal levels at different locations in the signal waveform were measured, and the ratio of the signals, So/(So+Sd) were calculated, where So was the signal without delay and Sd was the signal with the delay. The ratio of the signals after shaping amplifier depends on the signal rise time, which depends on the crystal decay time. Therefore, by measuring the ratio of the signals, signals from different scintillators with different decay times can be distinguished. This is the "signal branching method" described above.

Figure 8:
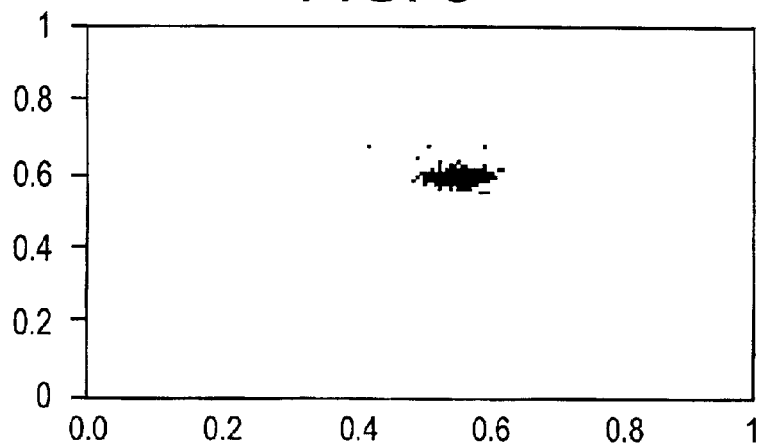
FIGS. 8–10 and 13 are position maps of scintillators according to the specific example of the present invention.

FIGS. 8 to 12 illustrate that different scintillator crystals can be separated by their different decay times. The X-axis for these figures is divided into increments of 0.2. A bismuth germanate ("BGO") scintillator crystal (2×2×10 mm3 size) was coupled to the PS-PMT at the edge. Its signals from the shaper were measured with two samples (So and Sd) at different waveform locations (before its peak). The shaping time used during the experiment was 1 micro second. The ratio of So/(So+Sd) was calculated for all collected events. The crystal's position map is shown in FIG. 8.

Figure 9:
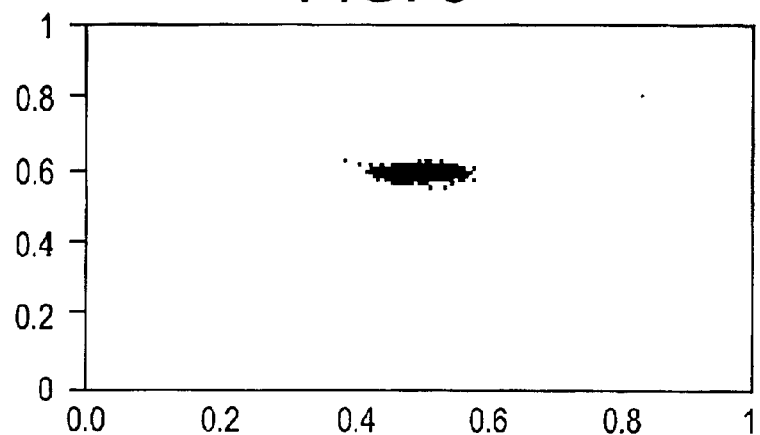
Figure 10:
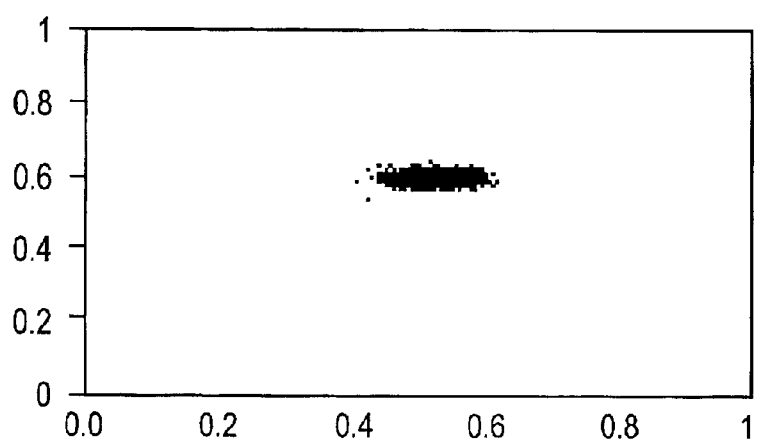

The same experimental setup and signal sampling process were then used for a lutetium oxyorthosilicate ("LSO") scintillator crystal (2×2×10 mm3 size). This crystal was placed adjacent to the BGO crystal. After that, the BGO crystal was removed and only LSO crystal data was measured, and its position map is shown in FIG. 9.

Figure 11:
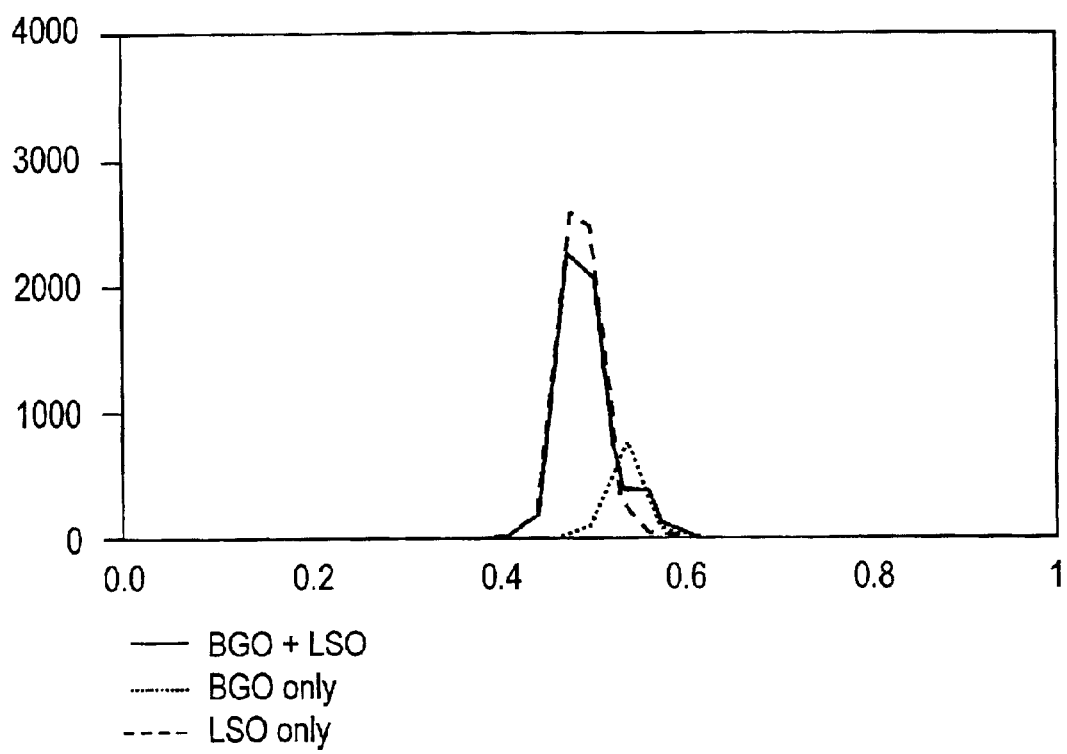
FIGS. 11, 12 and 14 are signal intensity plots of scintillators according to the specific example of the present invention.
Figure 12:
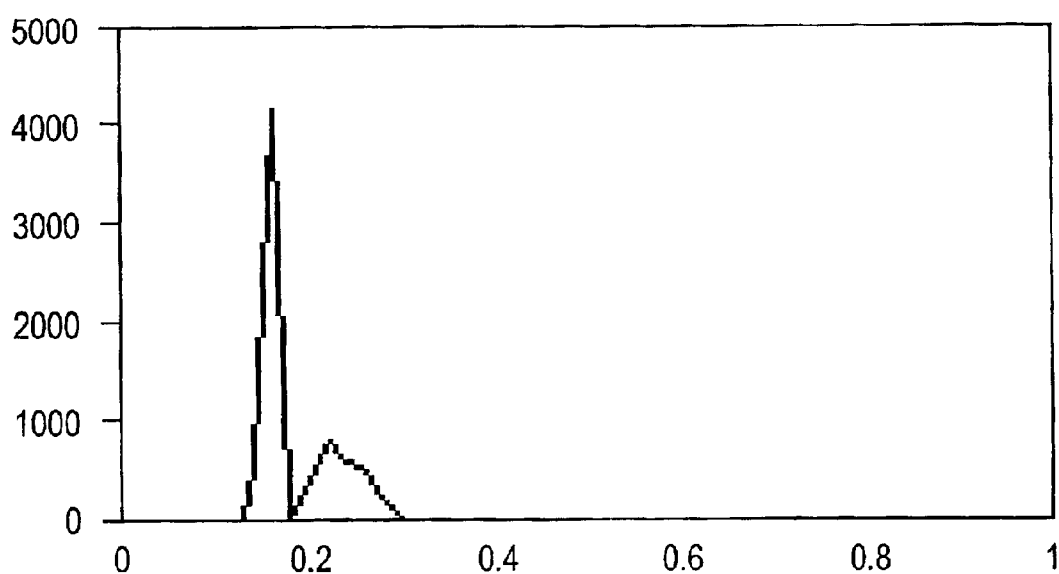

Then, the BGO crystal was placed back against the edge of the PS-PMT, and data from both BGO and LSO crystals were measured. Their position map shown in FIG. 10. The signal ratios were calculated for these three measurements. FIG. 11 shows the distribution of signal ratios: BGO only (smallest peak), LSO only (largest peak), and BGO and LSO together (middle peak). A clear separation exists between the peaks due to the BGO and LSO crystals. However, there is an overlap between the peaks. The overlap is mainly because the Compton scatter in the LSO signal overlapped with the Compton scatter in the BGO signal, which caused the overlap in the ratio distribution. In addition, the shaped signal is not very sensitive to the rise time compared with the signal before the shaping, particularly when the signals from different crystals are not optimized individually.

In FIG. 11, the bias and energy thresholds were optimized for both BGO and LSO crystals at separated measurements. Thus, a tradeoff in these values was made. However, when bias and energy thresholds were optimized for the BGO and LSO crystals individually, then a large separation between the BGO and LSO peaks was observed in FIG. 12. The number of counts collected from the BGO crystal was much lower than the number of counts from the LSO crystal even with the same data collection time because BGO has much slower decay time (~300 ns) and lower light output compared with LSO (~40 ns decay time).

Figure 13:
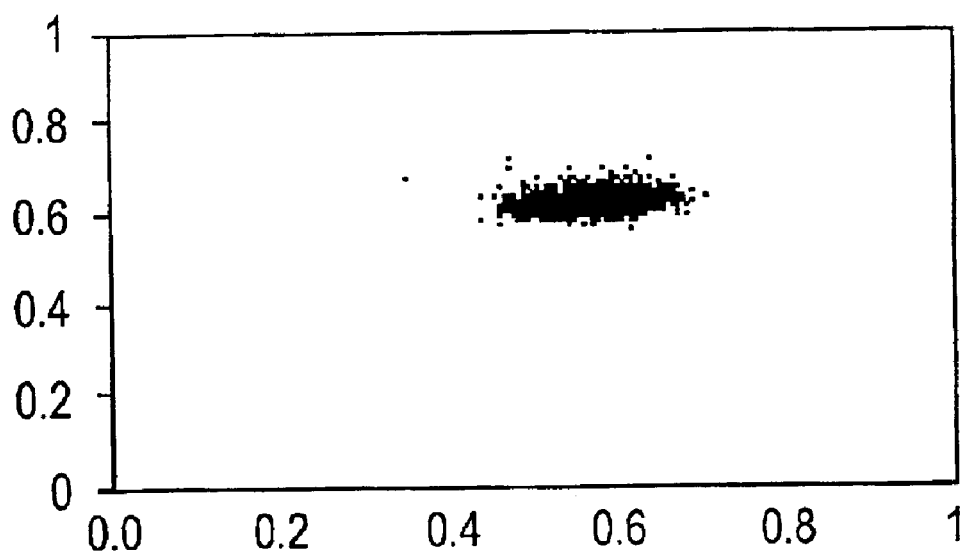
Figure 14:
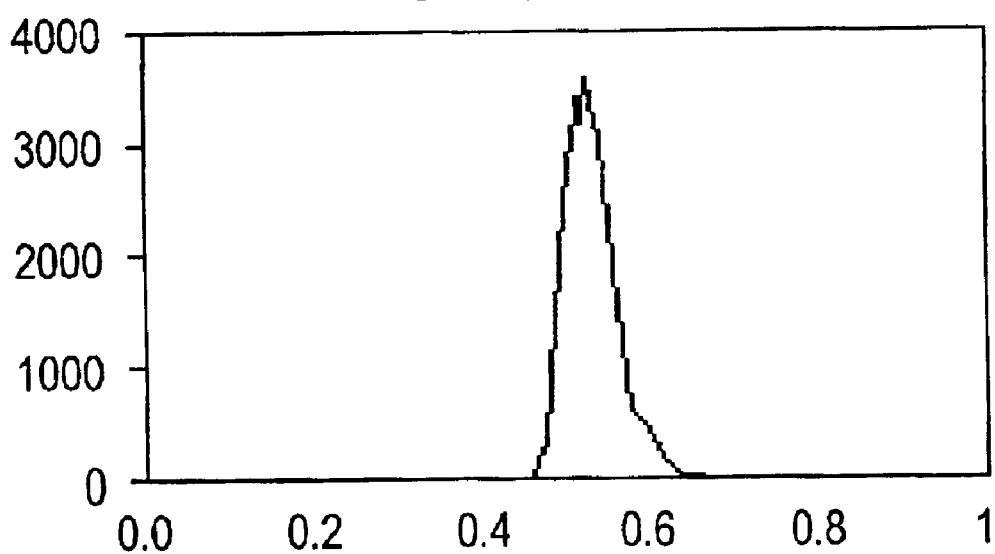

Following the above experiments, the BGO and LSO crystals were optically coupled together by being placed in physical contact, with the BGO crystal being attached to the radiation insensitive area of the PS-PMT. FIG. 13 shows their position map. Both crystals were included in the same "blob" to indicate optical coupling. The distribution of the crystal signal ratios is shown in FIG. 14. This specific example demonstrates that the BGO and LSO crystals can be identified by using the signal branching or split signal timing method, even though there is an overlap between the signal peaks in this measurement method mainly because the shaped signal is not very sensitive to the rise time. It is expected that if a direct signal integration method (as described above) was used instead, and the signal is integrated with two different integration times, then the ratio of the integration values will be more sensitive to the scintillator decay time.

Thus, the scintillator crystals can be optically coupled and placed at the edge of the PS-PMT to detect all light photons. The crystal at the edge can be distinguished from the adjacent crystal even if they are optically coupled together based their different decay times.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. A detector, comprising:
   a first position sensitive radiation detector having a first radiation sensitive area and a second radiation insensitive area;

a first scintillator having a first decay time, located adjacent to the first radiation sensitive area; and a second scintillator having a second decay time different than the first decay time, located adjacent to the second radiation insensitive area and being optically coupled to the first scintillator.

2. The detector of claim 1, wherein:

the first area and the second area comprise adjacent areas on a surface of the position sensitive detector; and a first face of the first scintillator is connected to the first area;

a first face of the second scintillator is connected to the second area; and a first edge of the first scintillator contacts a first edge of the second scintillator to optically couple the first and the second scintillators.

3. The detector of claim 2, wherein:

the position sensitive detector comprises a position sensitive photomultiplier tube (PS-PMT);

the second area comprises an edge of the PS-PMT detection surface; and the first and the second scintillators comprise gamma ray sensitive scintillator crystals mounted to the PS-PMT detection surface.

4. The detector of claim 2, wherein:

the position sensitive detector comprises a solid state photodetector;

the second area comprises an edge of the photodetector detection surface; and the first and the second scintillators comprise gamma ray sensitive scintillator crystals mounted to the photodetector detection surface.

5. The detector of claim 2, wherein the detector comprises a portion of a SPECT system.

6. The detector of claim 2, wherein the detector comprises a portion of a PET system.

7. The detector of claim 6, further comprising:

a second position sensitive radiation detector having a first radiation sensitive area and a second radiation insensitive area;

a third scintillator having a third decay time, located adjacent to the first radiation sensitive area; and a fourth scintillator having a fourth decay time different than the third decay time, located adjacent to the second radiation insensitive area and being optically coupled to the third scintillator.

8. The detector of claim 7, wherein:

the first and the second position sensitive detectors comprise a PS-PMT;

the second area comprises an edge of the PS-PMT detection surfaces; and the first, the second, the third and the fourth scintillators comprise gamma ray sensitive scintillator crystals mounted to the PS-PMT detection surfaces.

9. The detector of claim 8, wherein:

the first position sensitive detector is located on a first detector ring of the PET detector;

the second position sensitive detector is located on a second detector ring of the PET detector, where the first ring is located adjacent to the second ring;

the second radiation insensitive area of the first position sensitive detector is located adjacent to the second ring; and the second radiation insensitive area of the second position sensitive detector is located adjacent to the first ring.

10. The detector of claim 1, wherein the first decay time of the first scintillator differs from the second decay time of the second scintillator by at least 20 nanoseconds.

11. The detector of claim 1, wherein:

the first scintillator emits radiation in the first radiation range based on receiving incident gamma rays;

the second scintillator emits radiation in the first radiation range based on receiving incident gamma rays;

radiation emitted by the first scintillator is received by the first area of the position sensitive detector;

radiation emitted by the second scintillator propagates through the first scintillator and is received by the first area of the position sensitive detector; and the first position sensitive detector is adapted to output a first electrical signal based on the radiation received by the first area.

12. The detector of claim 11, further comprising a processor electrically connected to the first position sensitive detector, wherein the processor is adapted to receive the first electrical signal, and to form a position sensitive image based on gamma rays received by the first and the second scintillators based on a difference between the first decay time and the second decay time.

13. A PET detection system, comprising:

a first detector ring;

a second detector ring adjacent to and coaxial with the first detector ring;

a first PS-PMT located on the first detector ring;

a second PS-PMT located on the second detector ring, adjacent to the first PS-PMT, such that a first edge area of the first PS-PMT detection surface is adjacent to a first edge area of the second PS-PMT detection surface;

a plurality of first scintillator pixels having a first decay time mounted adjacent to the detection surfaces of the first and the second PS-PMTs;

at least one second scintillator pixel having a second decay time different from the first decay time, mounted adjacent to each of the first edge area of the first PS-PMT detection surface and the first edge area of the second PS-PMT detection surface; and wherein each of the second scintillator pixels are optically coupled to an adjacent first scintillator pixel.

14. The system of claim 13, wherein:

the first scintillator pixels are located adjacent to radiation sensitive areas of the first and the second PS-PMTs detection surfaces;

the second scintillator pixel are located adjacent to radiation insensitive areas of the first and the second PS-PMT detection surfaces; and a first edge of at least one first scintillator pixel contacts a first edge of at least one second scintillator pixel to optically couple the first and the second scintillator pixels.

15. The system of claim 14, wherein:

the first detector ring comprises a plurality of first PS-PMTs;

the second detector ring comprises a plurality of second PS-PMTs;

at least one column of a plurality of second scintillator pixels is mounted to the first edge areas of the first and the second PS-PMTs.

16. The system of claim 15, further comprising:

a third detector ring adjacent to and coaxial with the second detector ring;

a third PS-PMT located on the third detector ring, such that a first edge area of the third PS-PMT detection surface is adjacent to a first edge area of the second PS-PMT detection surface;

a plurality of first scintillator pixels having a first decay time mounted adjacent to the detection surface of the third PS-PMT;

a plurality of second scintillator pixels having a second decay time different from the first decay time, mounted adjacent to the first edge area of the third PS-PMT detection surface; and wherein at least one second scintillator pixel is optically coupled to an adjacent first scintillator pixel.

17. The system of claim 14, wherein:

the first scintillator pixels emit radiation in response to receiving gamma rays;

the radiation sensitive areas of the first and the second PS-PMTs are adapted to receive radiation from the first scintillator pixels;

the second scintillator pixels emit radiation in response to receiving gamma rays;

the radiation sensitive areas of the first and the second PS-PMTs are adapted to receive radiation from the second scintillator pixels through adjacent optically coupled first scintillator pixels; and the first and the second PS-PMTs are adapted to output an electrical signal based on radiation received in the respective radiation sensitive areas.

18. The system of claim 17, further comprising a processor which is adapted to receive an electrical signal from the first and the second PS-PMTs and to form a position sensitive image from the received signals based on a difference between the first decay time and the second decay time.

19. The system of claim 13, wherein the first decay time differs from the second decay time by at least 20 nanoseconds.

20. The system of claim 19, wherein:

the first scintillator pixels are selected from a group consisting of MLS, BGO and LSO;

the second scintillator pixels are selected from a group consisting of MLS, BGO and LSO; and the scintillator material of the first scintillator pixels is the same or different from the scintillator material of the second scintillator pixels.

21. The system of claim 13, wherein:

there are no detection gaps between the first detector ring and the second detector ring; and the first and the second scintillator crystals are coupled to the respective first and second PS-PMTs without optical fibers.

22. An imaging method, comprising:

receiving electromagnetic radiation at a first scintillator from a radiation source;

emitting first radiation from the first scintillator having a first decay time;

receiving the first radiation at a first radiation sensitive area of a first position sensitive radiation detector;

receiving electromagnetic radiation at a second scintillator from the radiation source;

emitting second radiation from the second scintillator having a second decay time different than the first decay time;

propagating the second radiation through the first scintillator to the first radiation sensitive area of the first position sensitive radiation detector;

distinguishing a difference between the first decay time and the second decay time; and forming a position sensitive image from electromagnetic radiation received by the first and the second scintillators based on the difference between the first decay time and the second decay time.

23. The method of claim 22, wherein the step of distinguishing a difference between the first decay time and the second decay time comprises distinguishing a difference between the first decay time and the second decay time by using a signal integration method.

24. The method of claim 22, wherein the step of distinguishing a difference between the first decay time and the second decay time comprises distinguishing a difference between the first decay time and the second decay time by using a signal branching method.

25. The method of claim 22, wherein:

the electromagnetic radiation comprises gamma rays;

the first position sensitive detector comprises a PS-PMT;

the first scintillator is mounted adjacent to the first radiation sensitive area of a detection surface of the PS-PMT;

the second scintillator is mounted adjacent to a second radiation insensitive area of the detection surface of the PS-PMT.

26. The method of claim 25, further comprising:

outputting a first electrical signal based on the first and the second radiation received by the first area of the first position sensitive radiation detector; and receiving the first electrical signal at a processor.

27. The method of claim 26, further comprising:

receiving electromagnetic radiation at a third scintillator from a radiation source;

emitting first radiation from the third scintillator having a first decay time;

receiving the first radiation at a first radiation sensitive area of a second position sensitive radiation detector;

receiving electromagnetic radiation at a fourth scintillator from the radiation source;

emitting second radiation from the fourth scintillator having a second decay time different than the first decay time;

propagating the second radiation through the third scintillator to the first radiation sensitive area of the second position sensitive radiation detector;

outputting a second electrical signal based on the first and the second radiation received by the first area of the second position sensitive radiation detector;

receiving the first electrical signal at a processor;

forming the position sensitive image based on the first and the second electrical signals.

28. The method of claim 27, wherein:

the first position sensitive detector is mounted onto a first detector ring of a PET system; and the second position sensitive detector is mounted onto a second detector ring of the PET system, where the second detector ring is adjacent and coaxial with the first detector ring.

29. The method of claim 28, wherein the electromagnetic radiation comprises gamma rays are emitted by a human or an animal.

* * * * *